(12) United States Patent
Badenhorst (10) Patent No.: US 12,187,615 B2
(45) Date of Patent: Jan. 7, 2025

(54) COMPOSITION OF MATTER FOR THE CONVERSION OF BIOCHAR INTO LOW SURFACE AREA GRAPHITE

(71) Applicant: Carbonscape Limited, Christchurch (NZ)

(72) Inventor: Heinrich Badenhorst, Blenheim (NZ)

(73) Assignee: CARBONSCAPE LIMITED, Blenheim (NZ)

( * ) Notice: Subject to any disclaimer, the term of this patent is extended or adjusted under 35 U.S.C. 154(b) by 0 days.

(21) Appl. No.: 18/545,351

(22) Filed: Dec. 19, 2023

(65) Prior Publication Data

US 2024/0116761 A1   Apr. 11, 2024

Related U.S. Application Data

(63) Continuation of application No. PCT/NZ2023/050073, filed on Jul. 28, 2023.

(60) Provisional application No. 63/369,797, filed on Jul. 29, 2022.

(51) Int. Cl.
 *C01B 32/205* (2017.01)
(52) U.S. Cl.
 CPC ........ *C01B 32/205* (2017.08); *C01P 2002/72* (2013.01); *C01P 2006/12* (2013.01)
(58) Field of Classification Search
 CPC ..... C01B 32/05; C01B 32/205; C01B 32/215; B01J 6/00; B01J 31/22
 See application file for complete search history.

(56) References Cited

U.S. PATENT DOCUMENTS 11,426,350 B1 *  8/2022  MacKay ................... C05F 3/00

FOREIGN PATENT DOCUMENTS

| CN | 104629657 A | 5/2015 |
| CN | 112250063 A | 1/2021 |
| CN | 112768659 A | 5/2021 |
| CN | 114771140 A | 7/2022 |
| WO | 2016130026 A1 | 8/2016 |
| WO | 2024025426 A1 | 2/2024 |

OTHER PUBLICATIONS

English machine trnaslation of CN112768659A (2021).*
English machine translation of CN104629657A (2013).*
International Search Report and Written Opinion for International Application No. PCT/NZ2023/050073, dated Oct. 31, 2023, 10 pages.
Demir, M et al., "Graphitic Biocarbon from Metal-Catalyzed Hydrothermal Carbonization of Lignin", Ind. Eng. Chem. Res., 2015, vol. 54, pp. 10731-10739. See abstract; p. 10732, col. 1, para 3—col. 2, para I; Figure 2; p. 10735, col. 2, para 2—p. 10736, col. 2, para 3; Tables 3-5.

(Continued)

*Primary Examiner* — Richard M Rump
(74) *Attorney, Agent, or Firm* — Barnes & Thornburg LLP; Ryan L. Marshall (57) ABSTRACT

The present disclosure relates to composition of matter for a feedstock suitable for graphitization. In particular, the present disclosure relates to composition required for taking non-graphitizable carbon materials and producing a graphite product with preferred properties.

28 Claims, 4 Drawing Sheets

(56) References Cited

OTHER PUBLICATIONS

Shi, Z., "Iron-catalyzed Graphitization of Biochar to Produce Graphitic Carbon Materials", 2021, Degree Project in Materials Science and Engineering, KTH Royal Institute of Technology School of Industrial Engineering and Management, Stockholm, Sweden, pp. 1-33. See abstract; p. 6, chapter 2.2—p. 12, chapter 3.3.3; p. 22, chapter 4.3; p. 23-26, chapter 4.5; pp. 28-30, chapters 5-6.

* cited by examiner

COMPOSITION OF MATTER FOR THE CONVERSION OF BIOCHAR INTO LOW SURFACE AREA GRAPHITE

CROSS REFERENCE TO RELATED APPLICATIONS

This application is a continuation of PCT Application No. PCT/NZ2023/050073 filed on 28 Jul. 2023, which claims the benefit under 35 U.S.C. 119 (e) of U.S. Provisional Patent Application No. 63/369,797 filed on 29 Jul. 2022. The disclosures of these priority applications are incorporated herein in their entirety.

FIELD OF THE INVENTION

The present invention relates to a composition of matter appropriate for the conversion of biochar into graphite with a low surface area that is suitable for a wide range of applications. The composition of matter comprises a biochar, a metallic compound, a liquid and an additive formulation selected from one or more of the following: a surfactant, a binder, a dispersant, a rheology modifier, a wetting agent, an anti-foaming agent or any combination thereof.

BACKGROUND OF THE INVENTION

Graphite is either synthesised or obtained from natural deposits. Some carbon materials, such as coke and mesophase pitch can be transformed to graphite simply by heating and such materials are termed graphitizable. Rosalind Franklin [1] described graphitizing carbons as those that can transform into crystalline graphite by being heated to 3000 degrees Celsius. On the other hand, other carbon materials cannot simply be heated to be transformed into graphite and do not spontaneously transform into graphite at any temperature and are described as non-graphitising carbon materials.

The physical properties of the two classes of carbons are very similar before heat treatment. Both materials are generally derived from hydrocarbons and initially contain other elements like hydrogen, oxygen, nitrogen and sulphur. Graphitizing carbons tend to be aromatic in structure while non-graphitizing carbons tend to be aliphatic. Thus, a key differentiator between the two is the H:C ratio, being lower for aromatics. Only upon heating are the hetero elements driven off and the residual, carbon only, structure is created. A key step towards the formation of good quality, synthetically derived graphite is polycondensation reactions which form large poly-aromatic hydrocarbons (PAH's). Upon heating the PAH's align to form the structure of graphite, in some non-graphitizing carbons this structural alignment can be stopped by crosslinking. However, in many other the PAH's are simply not formed upon heat treatment resulting only in very small graphitic crystallites when heated to 3000 degrees Celsius.

The demand for graphite has increased significantly because of the need for graphite for lithium-ion batteries. The mining of natural graphite sources has significant environmental impacts. While the production of synthetic graphite requires crude oil and other non-renewable resources. There is a need for new methods of utilising renewable sources of carbon material for graphitization to produce graphite sustainably and economically. One such source is renewable biomass which when heated forms a carbonaceous char that is a non-graphitizing form of carbon.

SUMMARY OF THE INVENTION

The present disclosure provides a composition of matter comprising a biochar, a metallic compound, a liquid in which the metallic compound has minimal solubility and an additive formulation selected from one or more of a surfactant, a binder, a dispersant, a rheology modifier, a wetting agent, an anti-foaming agent or any combination thereof. This particulate, wet slurry mixture has a set of unique properties which allows it to produce a graphite material with low surface area at high conversion rates when heat treated. By varying the amounts of the components, the graphite material properties can be tuned to suit a specific application. This cannot be as readily achieved using dissolved metal compounds because their solubilities are limited in a given liquid and controlling the size of precipitated particles is practically infeasible beyond a limited range. Methods for producing this composition of matter are also disclosed.

In the first aspect there is provided a composition of matter comprising a mixture of a biochar, a metallic compound, a liquid and an additive formulation, wherein the mixture comprises (a) a biochar between about 1 to about 90 percent by weight, (b) metallic compound of between about 2 to about 90 percent by weight, (c) a liquid of between 0.001 and about 83 percent by weight and (d) an additive formulation of between about 0.001 and about 5 percent by weight, wherein the additive formulation is selected from one or more of the following: a surfactant, a binder, a dispersant, a rheology modifier, a wetting agent, an anti-foaming agent or any combination thereof.

It is to be appreciated that any weight percent of the four components can be selected from these stated ranges, provided the total sums up to 100%.

In one embodiment, the liquid is chosen to ensure that when the composition is in use there is minimal solubility of the metallic compound in the liquid. In a further embodiment the liquid is water.

In one embodiment the metallic compound comprises a transition metal. In a further embodiment the transition metal is selected from chromium, zirconium, molybdenum, ruthenium, rhodium, palladium, silver, cadmium, zinc, copper, nickel, cobalt, iron, manganese, chromium, vanadium or any combination thereof.

In one embodiment any non-metallic portion of the metallic compound may alternatively be derived from the use of any inorganic acid to create a salt such as a fluoride, chloride, sulphate, nitrate, phosphate, carbonate, etc. Alternatively, an organic acid can create an organic salt. Upon heat treatment, most of these inorganic and organic compounds will undergo decomposition(s) to form a metal oxide, thus it is also possible to use these indirectly. Other intermediate compounds may also be formed depending on the selected starting metal compound.

In one embodiment the metallic compound is a transition metal oxide. In a further embodiment the transition metal oxide is selected from oxides of iron, copper, nickel, manganese, vanadium, tin, chromium, zinc, titanium and cobalt or any combination thereof.

In one embodiment the mixture is dried and on a dry wt/wt basis comprises (a) a metallic compound of between about 9.5 to about 90 percent by weight, (b) an additive formulation of between about 0.001 and about 5 percent by weight and (c) a biochar of between about 5 to about 90.5 percent by weight.

In one embodiment the mixture is dried and on a dry wt/wt basis comprises (a) a metallic compound of between about 19 to about 82 percent by weight, (b) an additive formulation of between about 0.001 and about 5 percent by weight and (c) a biochar of between about 13 to about 81 percent by weight. Any weight percent of the three components can be selected from these stated ranges, provided the total sums up to 100%.

In one embodiment, the metallic compound is a metal oxide.

In one embodiment the metal oxide is a transition metal oxide.

In one embodiment the transition metal oxide is selected from oxides of iron, copper, nickel, manganese, vanadium, tin, chromium, zinc, titanium and cobalt or any combination thereof.

In one embodiment the metal oxide is iron oxide.

In one embodiment the mixture is dried and on a dry wt/wt basis comprises (a) iron oxide of between about 9.5 to about 80 percent by weight, (b) the additive formulation of between about 0.001 and about 5 percent by weight and (c) a biochar of between about 20 to about 90.5 percent by weight, wherein the biochar has a fixed carbon content of about 70%. Any weight percent of the three components can be selected from these stated ranges, provided the total sums up to 100%.

In one embodiment the mixture is dried and on a dry wt/wt basis comprises (a) iron oxide of between about 19 to about 67 percent by weight, (b) the additive formulation of between about 0.001 and about 5 percent by weight and (c) a biochar of between about 33 to about 81 percent by weight, wherein the biochar has a fixed carbon content of at least 70%. Any weight percent of the three components can be selected from these stated ranges, provided the total sums up to 100%.

In one embodiment the biochar is created by thermally treating woody biomass.

In one embodiment the biochar in the mixture is in particulate form.

In one embodiment the initial particulate sizes of the biochar are less than about 50 millimetres.

In one embodiment the metallic compound in the mixture is in particulate form.

In one embodiment the metallic compound and biochar are both in particulate form.

In one embodiment the initial particulate sizes of the metallic compound are less than about 5 millimetres.

In one embodiment the initial particulate size of the biochar is less than about 50 millimetres and the initial particulate sizes of the metallic compound are less than about 5 millimetres.

In one embodiment the particulate sizes of the biochar are less than about 800 microns.

In one embodiment the particulate size of the biochar is less than about 500 microns.

In one embodiment the particulate sizes of the metallic compound are less than about 100 microns.

In one embodiment the particulate sizes of the metallic compound are less than about 75 microns.

In one embodiment the additive formulation comprises two or more of a surfactant, a binder, a dispersant, a rheology modifier, a wetting agent, an anti-foaming agent or any combination thereof. The additives must be selected on the basis of the chosen metallic compound and the chosen liquid in order to achieve suitable properties for the mixture in the chosen processing steps. In one embodiment the chosen metallic compound may tend to agglomerate in which case a suitable liquid-solid surface-active agent is required, in other embodiments the biochar or metallic compound will not be easily wettable by the liquid, in which case a wetting agent must be added to achieve a homogenous slurry mixture. In certain embodiments it may be necessary to pump the slurry from one container to another, in which case a rheology modifier may be required to achieve a suitable viscosity, in other embodiments the chosen liquid may lead to foam generation during the slurry mixing process and hence an anti-foaming agent will be required.

In one embodiment the additive formulation comprises one or more additives selected from: acResin®, ACRODUR®, ACROFLOR®, ACRONAL®, AEROSOL C-61, AG 6202, ALCOSPERSE 175, ALMIPAL P, Amidex®, Aminoethyl Ethanolamine, Ammonium Fluoride, AMMONYX M, AQACell®, Aquatreat BW30, Arkopal, Armac®, Armeen®, Armid O, Attagel®, Aziridine, BASONAT® polyisocyanates, Bronidox, BTBAB-90, BTBAC-50, Bteac-50, BTMAC-50, BTMAH-40, BUTOFAN® styrene-butadiene binders, BUTONAL® styrene-butadiene binders, Butyl Stearate, Calcium Stearate, Darvan®, Dispex®, Dodecandioic acid, DYSPERSE®, EDAPLAN®, EFKA®, ENORDET, Ethoduomeen T/25, EURAMAAT, EUR-AMID, EURANAAT, EURASOL, EUROGLYC, EUROQUAT, EUROWET, EUROXIDE, EXOdis PC30, FOAMASTER MO 2133, FOAMSTAR®, Heliogen Blue D 7079, HYDROPALAT®, JONCRYL®, Lauryl Alcohol, Lipal MSC, Lipal NTD, Magna Surf®, MERPOL SE, METOLAT®, NANSA, Oleamid, Oleic acid, Pasatell M-182 (2-798), PEG-400, Pentaerythritol Oleate, POIZ 520, POIZ 530, Polyamides, Polyesters, POLYFON H, Polyglycols, Polyman®, Polymerizable Additives, Potassium Soyate, Quickpearl PK3, REAX®, REWOCID DU185 SE, Rewopol SB L 203, Rheovis®, ROKAmer 1010/50, Schercomid®, SDS, Sibet®, Sico 50BC, Sidos 70, Sodium dodecyl benzene sulphonate, Sodium N-hexadecanoyl-L-alaninate, Sodium silicate, Sorbitan Mono Oleate, Sorbitan Monopalmitate, Steamcare B12, Stearyl Chloride, STYROFAN®, SugaDet APG-10, Sulfoccinate LSS, Sulfochem®, Sulphated Butyl Oleate, Sunnol®, SURFACARE O ACID, TBAH-40, TBAHS-50, Tensol® DDM, TERGITOL®, TLMAC-30, TMAC-100 ARQUAD 41-100, Tomamine Amphoteric 12, Triethanolamine, Triethylbenzylammonium Chloride, TWEEN 80, UFACID K, Vitec®, YB-0100, YB-150, YB-191, YB-2000, YB-904, YBASD-200, or any combination thereof.

In another aspect there is provided a method of heat treating the composition as defined above, to a temperature above the reduction temperature of the metallic compound, thereby reducing it to an elemental metal or an alloy and converting the amorphous biochar carbon into crystalline graphitic carbon.

In one embodiment the conversion of amorphous char to crystalline graphite formed by the heat treatment of the mixture is greater than about 50%.

In one embodiment the conversion to graphite is greater than about 75%.

In one embodiment the degree of crystallinity of the crystalline graphite formed by the heat treatment of the mixture is greater than about 90%.

In one embodiment the degree of crystallinity of the crystalline graphite is greater than about 95%.

In one embodiment the specific surface area of the graphite formed by the heat treatment of the composition of matter defined above is less than about 50 m$^2$/g.

In one embodiment the specific surface area of the graphite is less than about 30 m$^2$/g.

In one embodiment the method includes the steps of:
i) thermally treating biomass in particulate form at a temperature of between about 200 and about 1000 degrees Celsius under inert conditions to form a particulate biochar;
ii) milling the biochar to obtain a particle size of less than about 800 microns, more preferably less than 500 microns;
iii) milling a suitable metallic compound to obtain a particle size of less than about 100 microns, more preferably less than 75 microns:
iv) combining the resulting biochar with the metallic compound, a liquid and an additive formulation; and.
v) heating the mixture to between about 400 and about 3000 degrees Celsius under inert conditions to create graphitic carbon.

In one embodiment the biomass is thermally treated in water in a hydrothermal step to produce the biochar.

In one embodiment the biomass is thermally treated under inert conditions in a dry pyrolysis step to produce the biochar.

In one embodiment the biomass is forestry residue.

In one embodiment the forestry residue is sawdust.

In one embodiment the biomass is lignocellulosic biomass or a lignin derivative.

In one embodiment the biomass is woodchip or any other wood-based material.

In one embodiment the liquid is water.

In one embodiment the liquid and metallic compound are chosen to ensure that when in use there is minimal solubility of the metallic compound in the liquid.

In one embodiment in step iv) the metallic compound is combined with the biochar by wet blending together in a mixer with an additive formulation.

In one embodiment in step iv) the metallic compound is combined with the biochar by wet milling together in a mill with an additive formulation.

In one embodiment in step iv) a particulate slurry in water is formed by combining the metallic compound in water with an additive formulation using a mixer to produce a particulate metallic compound slurry.

In one embodiment, the additive formulation for the particulate metallic compound slurry comprises a surfactant, a binder, a dispersant, a rheology modifier, a wetting agent, an anti-foaming agent or any combination thereof.

In one embodiment in step iv) a particulate slurry in water is formed by combining the biochar in water with an additive formulation using a mixer to produce a particulate biochar slurry.

In one embodiment the additive formulation for the particulate biochar slurry further comprises a surfactant, a binder, a dispersant, a rheology modifier, a wetting agent, an anti-foaming agent or any combination thereof.

In one embodiment the particulate metallic compound slurry is combined with the particulate biochar slurry and then blended together in a mixer.

In one embodiment the mixture obtained in step (iv) is heated in step (v) to between about 400 and about 3000 degrees Celsius under inert conditions to create graphitic carbon using an atmosphere-controlled oven, furnace or other heating device, with the proviso that the heat treatment temperature must be above the reduction temperature of the selected metallic compound to ensure that it is reduced to an elemental metal or alloy state.

In one embodiment, the metallic compound is a metal oxide.

In one embodiment the metal oxide is a transition metal oxide.

In one embodiment the transition metal oxide is selected from oxides of iron, copper, nickel, manganese, vanadium, tin, chromium, zinc, titanium and cobalt or any combination thereof.

The foregoing and other aspects or advantages of the present invention will be apparent to those skilled in the art, using the detailed description, images, analytical results and performance test outcomes provided in this specification.

DETAILED DESCRIPTION OF THE INVENTION

The following description sets forth numerous exemplary configurations, parameters, and the like. It should be recognised, however, that such description is not intended as a limitation on the scope of the present invention but is instead provided as a description of exemplary embodiments.

All references, including patents and patent applications, cited in this specification are hereby incorporated by reference. No admission is made that any reference constitutes prior art. Nor does discussion of any reference constitute an admission that such reference forms part of the common general knowledge in the art, in New Zealand or in any other country.

Definitions

In each instance herein, in descriptions, embodiments, examples, and claims, the terms "comprising", "including", etc., are to be read expansively, without limitation. Thus, unless the context clearly requires otherwise, throughout the description and the claims, the words "comprise", "comprising", and the like are to be construed in an inclusive sense as to opposed to an exclusive sense, that is to say in the sense of "including but not limited to".

As used herein, the articles "a" and "an" are used to refer to one or to more than one (i.e., to at least one) of the grammatical object of the article. By way of example, "an element" can be taken to mean one element or more than one element.

The term "about" or "approximately" is used to indicate a broader range centred on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Unless defined otherwise, the scientific and technological terms and nomenclature used herein have the same meaning as commonly understood by a person of ordinary skill to which this disclosure pertains.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the first significant digit. Thus, a value 1.105 implies a value from 1.0 to 1.2, whereas 110.5 given by $1.105 \times 10^2$, implies a value from 100 to 120.

As used herein the terms "biochar" or "carbonaceous char" or "char" are used interchangeably to mean a material resulting from the thermal decomposition of a carbonaceous material in an inert atmosphere.

As used herein the term "metal compound" or "metallic compound" are used interchangeably and these terms mean an organic or inorganic material containing a transition or non-transition metal, such as but not limited to chromium, zirconium, molybdenum, ruthenium, rhodium, palladium, silver, cadmium, zinc, copper, nickel, cobalt, iron, manganese, vanadium, sodium, magnesium, potassium calcium, tin, or lead.

As used herein the term "minimal solubility", when used in relation to the metallic compound, means a metallic compound of which less than about 0.1 g will dissolve in about 100 ml of the chosen liquid at a neutral pH of 7.

As used herein the term "amorphous" means a material with no long- or short-range structural ordering, as opposed to a crystal which has an atomic arrangement in the form of a regular lattice, comprised of repetitions of a defined unit cell.

As used herein the term "allotropes" means materials with the same elemental composition, such as pure carbon for example, but with different forms or atomic configurations, for example diamond versus graphite or amorphous biochar/char versus graphite.

As used herein the term "thermally treated" means any thermal treatment process that is applied to biomass at a temperature sufficient to create a biochar, including hydrothermal and dry pyrolysis.

As used herein the term "liquid" means a fluid in the liquid phase, such as without limitation, water.

As used herein the term "water" means a water source, including low quality water sources, such as saline water, brine water or waste water.

As used herein the term "additive formulation" means an agent selected from one or more of the following: a surfactant, a binder, a dispersant, a rheology modifier, a wetting agent, an anti-foaming agent or any combination thereof. Alternatively, "additive formulation" may refer to a formulation including one or more agents selected from one or more of the following: a surfactant, a binder, a dispersant, a rheology modifier, a wetting agent, an anti-foaming agent or any combination thereof. It is to be appreciated that the additive formulation may comprise any number of combinations of the surfactant, binder, dispersant, rheology modifier, wetting agent, and/or anti-foaming agent. For example, as shown in Table 1, the additive formulation may include at least a binder and at least a surfactant. Alternatively, the additive formulation may include any combination of three or more, four or more, or five or more of a surfactant, a binder, a dispersant, a rheology modifier, a wetting agent, and/or an anti-foaming agent. Further, it is to be appreciated that a single agent may have a multifunctional effect. For example, a single agent may function as a surfactant and a wetting agent. The additive formulation may optionally include one or more additional agents, such as, without limitation one or more carriers, solvents, or a combination thereof.

TABLE 1

Exemplary additive formulations comprising possible combinations of at least agent a and at least agent b.

| | | Agent a | | | | |
|---|---|---|---|---|---|---|
| | | Binder | Dispersant | Rheology Modifier | Wetting Agent | Anti-foaming Agent |
| Agent b | Surfactant | X | X | X | X | X |
| | Binder | | X | X | X | X |
| | Dispersant | | | X | X | X |
| | Rheology Modifier | | | | X | X |
| | Wetting Agent | | | | | X |

Composite of Biochar, Metal Compound, a Liquid and Additive Formulation

The composition of matter described in this specification comprises a mixture of a biochar, an insoluble metallic compound, a liquid and an additive formulation. The biochar is typically derived from the pyrolysis of woody biomass. The metallic compound typically comprises a transition metal. The liquid is typically water. The additive formulation comprises one or a multifunctional mixture of one or more components selected from: a surfactant, a binder, a rheology modifier, a dispersant, a wetting agent, an anti-foaming agent or any combination thereof. To produce the mixture of interest, the components are mixed or milled, either together or separately and then combined. To convert the mixture into graphite it may then be subjected to a heat treatment procedure at a temperature of between 400 and 3000 degrees Celsius, depending on the reduction temperature of the selected metallic compound, for soak time periods of between 60 seconds and 20 hours.

In general, a biochar is produced by heat treating or "pyrolyzing" a biomass starting material, such as wood chips, sawdust, forestry waste, or any plant derived feedstock, under an inert atmosphere, for example nitrogen, at temperatures of between 200 and 1000 degrees Celsius, for time periods of between a few seconds ("fast" pyrolysis) and several hours. Alternatively, the biomass can be converted into char using hydrothermal heat treatment. Here the char and water are placed in an autoclave at around 360 degrees Celsius and a pressure of approximately 200 bar for the same time periods as pyrolysis, followed by drying. In all cases the resulting char is comprised mainly of the element carbon, with a so-called fixed carbon content above at least 40% but more usually at least 60%. The remainder is comprised of a set of heteroatoms, mainly hydrogen, oxygen, nitrogen and sulphur. In addition, the char may contain volatile matter, described as hydrocarbons, aliphatic or aromatic, which are of high enough molecular weight to not have been vaporised during the heat treatment. The exact composition will depend on the heat treatment conditions and the selected biomass starting material. The resulting char material is conventionally referred to as a "green" char. Any of the biochar materials described thus far could be selected for the creation of the composition of matter described in this specification.

The metallic compound insoluble in the liquid may be any one of the innumerable metallic compounds which are possible. The metal component of the compound is preferably a transition metal, such as but not limited to chromium, zirconium, molybdenum, ruthenium, rhodium, palladium, silver, cadmium, zinc, copper, nickel, cobalt, iron, manganese, chromium, vanadium or any combination thereof. However, the metal component may also be comprised of non-transition metals such as: sodium, magnesium, potassium, calcium, tin, lead and others. Alternatively, the non-metallic portion of the compound may be derived from the use of any inorganic or organic acid to create a salt such as a fluoride, chloride, sulphate, nitrate, phosphate, carbonate, etc. Upon heat treatment, most organic and inorganic compounds will undergo decomposition(s) to form a metallic compound thus it is also possible to use these indirectly. Other intermediate compounds may also be formed depending on the selected starting metal compound.

To achieve homogenous distributions during mixing and ensure minimal closed or inaccessible porosity, it is necessary to mill both the biochar and metallic compound, either separately or together. The milling step is conducted using any conventional mill such as a ball mill, rod mill, pebble mill, bead mill, jet mill, planetary mill, vibratory mill, disc mill, grinding mill, air classifying hammer mill and the like. Co-milling of the char and metallic compound achieves intimate contact however it is difficult to control the achieved particle size distribution of each component. The biochar is milled to a particle size of less than about 800 microns and more preferably below about 500 microns. The metallic compound is milled to a particle size of less than about 100 microns and more preferably below about 75 microns.

In general, several options exist for mixing the biochar and a metal compound. If the metal compound is water soluble the compound can simply be dissolved in distilled or de-ionised water and the biochar soaked in this solution followed by drying. Since the metal compound is homogenously dissolved in the water it is also homogenously distributed over the biochar following drying. However, in this case it is difficult to control the relative amounts of the char and metal compound. The maximum amount of metal compound which may be deposited is directly limited by the maximum solubility of the compound in the given liquid which can be largely constant over the usable temperature range. In the case of water for example, 0 to 100 degrees Celsius. Furthermore, practically achieving even drying is very difficult on inhomogeneous surfaces or porous particles, as is control of the achieved particle size distribution of the dried metallic compound.

The two solids can simply be combined dry in a suitable solids mixer or by co-milling. This approach allows direct control of the relative amounts of each component, however achieving a homogenous distribution is difficult when mixing the two solids in question. Biochar tends to be highly porous with erratic, grooved surfaces, making it difficult to evenly distribute the metallic compound particles across the exposed surfaces, both inner and outer. Furthermore, the metallic compounds can often tend to agglomerate, resulting in substantially larger particle sizes than originally achieved during milling.

The third option combines the prior methods through the use of a wet particulate slurry. In this case both particulate, insoluble solids are placed in suspension using a suitable liquid medium, followed by blending and then optionally removal of the medium resulting in a dry mixture. This approach allows the two components to be combined in a fixed ratio. In this way the relative amounts of each component, as well as their distributions can be precisely tuned to achieve the exact set of final properties required by a specific application.

Furthermore, the use of a liquid slurry means that the metallic compound is homogenously distributed in and over all the surfaces of the biochar. Typically, the medium or liquid is water and the mass ratio of liquid to other components is between 0.3 to 5. To ensure adequate wettability, homogenous distribution for the respective particles and distribution retention upon drying, it is necessary to use an additive formulation for one or both particulate slurries. The additive formulation comprises a multifunctional mixture of components comprising at least one or a combination of: a surfactant, a binder, a dispersant, a rheology modifier, a wetting agent, an anti-foaming agent and any combination thereof.

Depending on the selected insoluble metallic compound and the source of biochar, the selection and relative amount of each component in the additive formulation may need to be varied to achieve the optimal distribution while undergoing the required processing steps. For example, the chosen metallic compound may tend to agglomerate in which case a suitable liquid-solid surface-active agent is required, in other situations the biochar or metallic compound will not be easily wettable by the liquid, in which case a wetting agent must be added to achieve a homogenous slurry mixture. In certain processes it may be necessary to pump the slurry from one container to another, in which case a rheology modifier may be required to achieve a suitable viscosity, in other cases the chosen liquid may lead to foam generation during the slurry mixing process and hence an anti-foaming agent will be required.

The components of the additive formulation may be selected from one or more of the following: acResin®, ACRODUR®, ACROFLOR®, ACRONAL®, AEROSOL C-61, AG 6202, ALCOSPERSE 175, ALMIPAL P, Amidex®, Aminoethyl Ethanolamine, Ammonium Fluoride, AMMONYX M, AQACell®, Aquatreat BW30, Arkopal, Armac®, Armeen®, Armid O, Attagel®, Aziridine, BASONAT® polyisocyanates, Bronidox, BTBAB-90, BTBAC-50, Bteac-50, BTMAC-50, BTMAH-40, BUTOFAN® styrene-butadiene binders, BUTONAL® styrene-butadiene binders, Butyl Stearate, Calcium Stearate, Darvan®, Dispex®, Dodecandioic acid, DYSPERSE®, EDAPLAN®, EFKA®, ENORDET, Ethoduomeen T/25, EURAMAAT, EUR-AMID, EURANAAT, EURASOL, EUROGLYC, EUROQUAT, EUROWET, EUROXIDE, EXOdis PC30, FOAMASTER MO 2133, FOAMSTAR®, Heliogen Blue D 7079, HYDROPALAT®, JONCRYL®, Lauryl Alcohol, Lipal MSC, Lipal NTD, Magna Surf®, MERPOL SE, METOLAT®, NANSA, Oleamid, Oleic acid, Pasatell M-182 (2-798), PEG-400, Pentaerythritol Oleate, POIZ 520, POIZ 530, Polyamides, Polyesters, POLYFON H, Polyglycols, Polyman®, Polymerizable Additives, Potassium Soyate, Quickpearl PK3, REAX®, REWOCID DU185 SE, Rewopol SB L 203, Rheovis®, ROKAmer 1010/50, Schercomid®, SDS, Sibet®, Sico 50BC, Sidos 70, Sodium dodecyl benzene sulphonate, Sodium N-hexadecanoyl-L-alaninate, Sodium silicate, Sorbitan Mono Oleate, Sorbitan Monopalmitate, Steamcare B12, Stearyl Chloride, STYROFAN®, SugaDet APG-10, Sulfoccinate LSS, Sulfochem®, Sulphated Butyl Oleate, Sunnol®, SURFACARE O ACID, TBAH-40, TBAHS-50, Tensol® DDM, TERGITOL®, TLMAC-30, TMAC-100 ARQUAD 41-100, Tomamine Amphoteric 12, Triethanolamine, Triethylbenzylammonium Chloride, TWEEN 80, UFACID K, Vitec®, YB-0100, YB-150, YB-191, YB-2000, YB-904, YBASD-200, or combinations thereof.

Thus, following mixing and pre-drying if required, a blended composite of biochar, a metallic compound and an additive formulation is obtained. When this mixture is subjected to a heat treatment procedure at a temperature of between 400 and 3000 degrees in order to produce graphite, several important changes occur. The residual liquid is removed and practically all of the residual heteroatoms and volatile matter present in the biochar are removed, resulting in a material that is virtually exclusively carbon and has a fixed carbon content in excess of ~99%. This material is conventionally referred to as a "calcined" or "fully carbonized" biochar. The amount of fully carbonized biochar is approximately equal to the fixed carbon content of the original biochar. In the presence of carbon such as biochar at high temperatures, above 400 degrees Celsius, the metallic compound or any formed intermediate compound(s) will be reduced to their metallic state. The reduction is typically achieved under an inert atmosphere and some of the biochar is consumed. Thus, during heat treatment, the char is carbonized to pure carbon and the metallic compound is reduced to a pure metal or alloy.

As additives are most commonly long chain polymers these will degrade upon heating above a few hundred degrees Celsius. This will be accompanied with significant mass loss because gaseous decomposition products are formed. In some cases, lighter elements or compounds present will also be evaporated or sublimated depending on the final temperature. Furthermore, since the additive formulation typically comprises less than 5 wt % of the initial mixture before heat treatment, the residual additive formulation is negligible following heat treatment.

All the metallic compound described above have different elemental compositions, however, since all the metal compounds are reduced to their metallic state during the heat treatment step, it is convenient to simply refer to the metal content in relation to the heat-treated material. Furthermore, since the biochar is carbonized during the heat treatment step to approximately 99 wt % carbon, the composition of the mixture following heat treatment can be simplistically described as a binary mixture of a metal and carbon. Thus, for convenience, the carbon in the binary mixture is described as the fixed carbon in the biochar fraction of the mixture and the metal in the binary mixture is described as the metallic portion of the metallic compound present in the mixture.

When an elemental metal is exposed to a carbon source such as char at a temperature of between about 400 and about 3000 degrees Celsius under inert conditions, the process of catalytic conversion will occur. Hereby the amorphous char will be converted into highly crystalline graphite over time. In so doing converting one allotrope of pure carbon into another. The extent and speed of formation of the graphite is highly dependent on the selected metal but is relatively insensitive to the original choice of biomass, mainly because it has been carbonized. The exact mechanism of the catalytic transformation is still unknown but two plausible theories have been put forward, namely dissolution-precipitation and carbide formation-decomposition. In the former a carbon source is dissolved in the metal and graphite is spontaneously precipitated due to differences in their free energy or level of structural ordering. In the latter an unstable metal carbide is formed, which spontaneously decomposes to yield graphite. The exact formation mechanism is not relevant to the current disclosure.

Depending on the selected biochar, metallic compound, liquid and additive formulation, a varying amount of char will be converted into graphite. The properties of the resultant graphite will largely depend on the selected biochar, metallic compound, liquid and additive formulation. However, a key factor determining the achieved conversion has proven to be the relative percentages of carbon and metal, referred to previously as the binary mixture after heat treatment. The higher the percentage of metal, the higher the expected conversion in accordance with the catalytic effect of the metal. To achieve an economical and efficient process, conversion should be as high as possible without using excessive amounts of the metal compound. To achieve this efficiency, control of the particle size and distribution of the metallic compound particles are critical.

The second key property of the resultant graphite is its specific surface area (SSA). This property is a complex result of the distribution homogeneity and de facto particle size distribution of the metallic compound achieved in the mixture. Smaller particles will tend to form smaller graphite crystals with a low degree of crystallinity leading to higher specific surface areas and conversely larger particles will create large crystals with high degree of crystallinity and lower specific surface area. In general, since the concentration is limited, impregnation by a solution with a dissolved solid will result in a small particle size distribution following drying. On the other hand, solid-solid dry mixing at high loadings tends to result in large particle sizes due to agglomeration effects.

While the metallic compound can have innumerable different compositions and the biochar can have a wide range of fixed and volatile carbon depending on the pyrolysis conditions and temperature, the ratio of importance in terms of conversion is that of the metal present in the metallic compound to the fixed carbon present in the char. In general, a metal to carbon mass ratio of about 0.25 to about 2.03 is used.

Based on these considerations the overall composition of matter can be defined as comprising a mixture of a biochar, a metallic compound, a liquid and an additive formulation, wherein the mixture comprises (a) a biochar between about 1 to about 90 percent by weight, (b) a metallic compound of between about 2 to about 90 percent by weight, (c) a liquid of between 0.001 and about 83 percent by weight and (d) an additive formulation of between about 0.001 and about 5 percent by weight. Any weight percent of the four components can be selected from these stated ranges, provided the total sums up to 100%.

For the purposes of describing the exact compositions in more detail, a specific metallic compound and char fixed carbon can be selected. To simplify range specifications the liquid component is omitted, limiting the number of components to three. Without limitation iron oxide may be used in conjunction with a char having 70% fixed carbon to achieve a dried mixture. Conveniently the percentage of metal present in iron oxide is approximately 70%, the same as the fixed carbon of the selected char. In this case the effects cancel and the previously stated binary composition (metal to carbon mass ratio) translates directly into the desired metallic compound and char mixture composition (dry wt/wt basis). That is to say, the desired composition of char combined with metallic compound is between about 10 to about 80 wt % of metallic compound, more preferably about 20 to about 67 wt % of metallic compound, with char making up the difference.

The impact of the additional additive formulation can easily be calculated based on a fixed percentage of additive in the overall composition (dry wt/wt basis). The desired surfactant percentage is described as being 0.001% up to about 5 wt % of the final mixture (dry wt/wt basis). The additional component has a relatively minor impact on the overall composition of the mixture due to its low concentration. For the iron oxide case the desired composition of matter for the mixture (dry wt/wt basis) may then be described as being between about 9.5 to about 80 wt % of metallic compound, with between about 0.001 and about 5 wt % of additive formulation and the difference to be made up with char. More preferably the desired composition of matter (dry wt/wt basis) may be described as being between about 19 to about 67 wt % of metallic compound, with between about 0.001 and about 5 wt % of additive formulation and the difference to be made up with char. The metallic compound and char ranges are specified at the minimum surfactant concentration which results in the widest ranges for these components.

To account for other potential choices in metallic compound, a general range for the composition of matter can be specified for the mixture (dry wt/wt basis) by slightly increasing both sets of ranges: base and preferred. In this case the mixture (dry wt/wt basis) has (a) a metallic compound content of between about 9.5 to about 90 percent by weight, (b) a additive formulation component of between about 0.001 and 5 percent by weight and (c) a biochar making up the difference of between about 90 to about 5 percent by weight. More preferably the mixture (dry wt/wt basis) has (a) a metallic compound content of between about 19 to about 82 percent by weight (b), an additive formulation component of between about 0.001 and about 5 percent by weight and (c) a biochar making up the difference of between about 81 to about 13 percent by weight. The metallic compound and char ranges are specified at the minimum surfactant concentration which results the widest ranges for these components.

Based on the achieved particle sizes the expected outcomes for the different mixing approaches are summarized in Table 2.

TABLE 2

Expected outcomes

| Mixing method | Metal Content | Particle Distribution | Conversion | SSA |
|---|---|---|---|---|
| Wet solution | Low | Good | Low | High |
| Dry solids | High | Poor | High | Low |
| Wet slurry | Medium | Reasonable | Medium | Medium |

The practically observed outcomes are summarized in Table 3, as detailed in examples 1 to 3.

TABLE 3

Observed outcomes

| Mixing method | Metal Content | Particle Distribution | Conversion into Graphite | SSA |
|---|---|---|---|---|
| Wet solution | Low | Good | High | High |
| Dry solids | High | Poor | Medium | Low |
| Wet slurry | High | Good | High | Low |

Despite only achieving a low metal to carbon ratio, the wet solution method surprisingly achieved a high conversion into graphite. The higher than expected conversion is thought to be because of increased mobility of the small metal particles relative to the larger particles created during dry mixing. Conversely, despite achieving a higher loading of catalyst, dry solid mixing only achieved a medium level of conversion. Most surprisingly the good distribution of finely milled metal compound particles achieved during wet slurry mixing is capable of simultaneously achieving a material with high conversion and low surface area. This is unexpected based on prior observations for wet solution and dry mixing cases where one property was traded off against another and as such expectations would have been for both properties to be partially compromised. Instead, the use of an additive formulation in conjunction with the particulate material slurries results in an optimized system which maximises conversion to the preferred low specific surface area product. Furthermore, the properties of the material can be fine-tuned in a unique manner by directly controlling the relative sizes and amounts. Which is impossible for dissolved metallic compounds where they are limited by their maximum solubility in a given liquid and lack of particle size control. Thus, using the current composition of matter a range of sizes between the fine distributions of wet solution introduction to the coarse grains of dry solids mixing can be achieved.

EXAMPLES

The examples described herein are provided for the purpose of illustrating specific embodiments of the invention and are not intended to limit the invention in any way. Although the examples described herein have been used to describe a method, it is understood that such detail is solely for this purpose and variations may be made therein by those skilled in the art without departing from the spirit and scope of the overall process.

Figure 1:
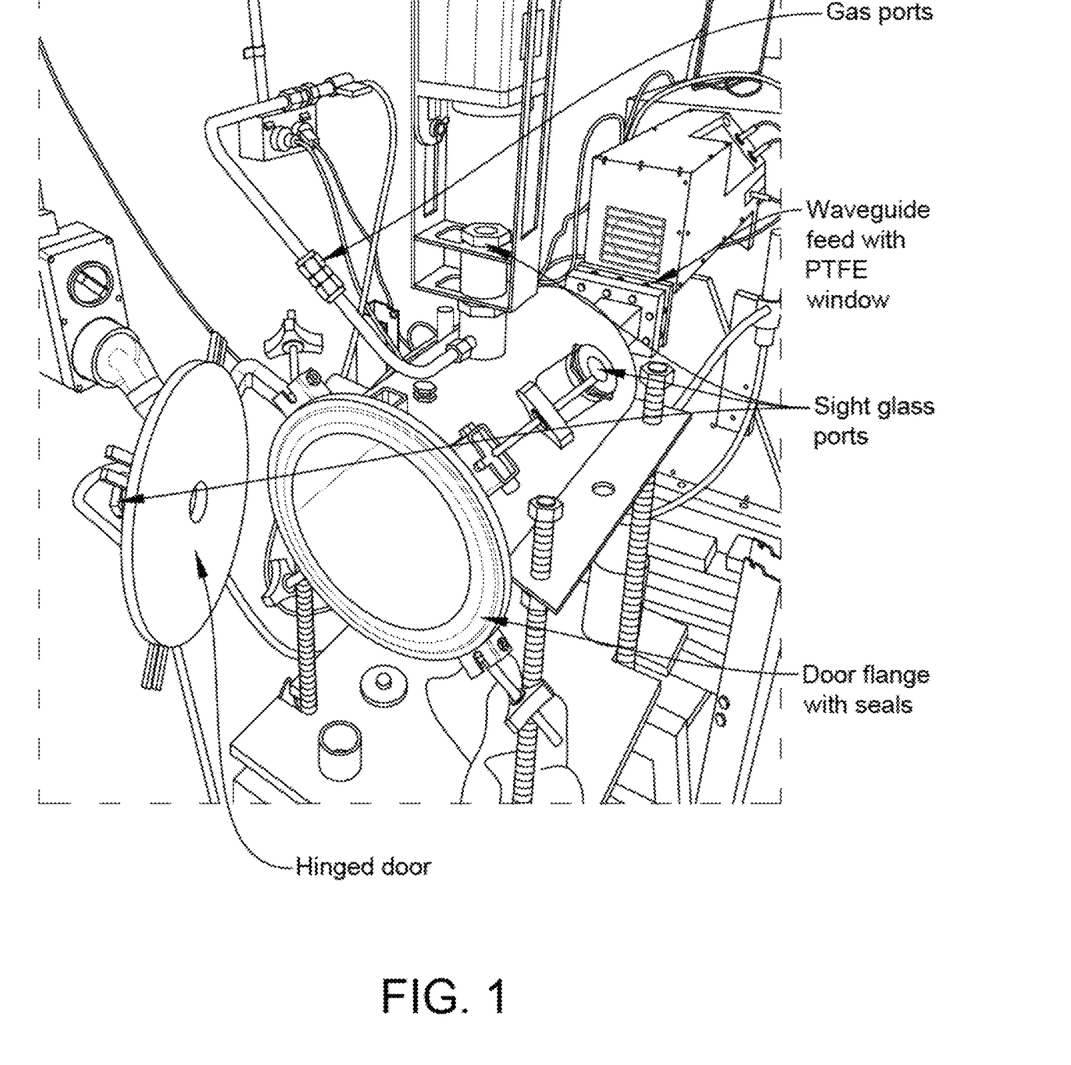
FIG. 1 shows an image of the microwave applicator used to generate the graphite samples described in this specification.
Figure 2A:
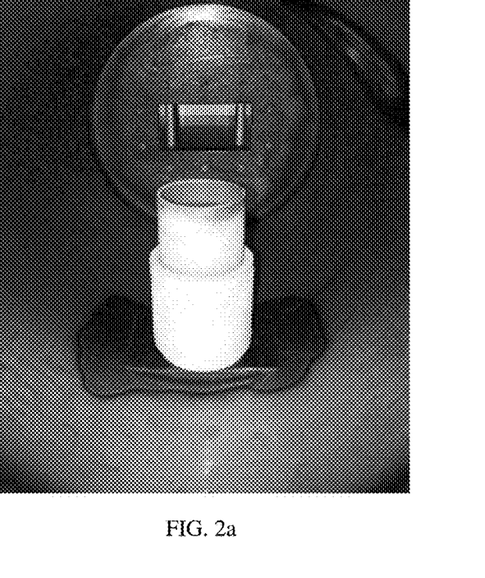
FIG. 2a shows an image of the sample crucible placement in the microwave applicator.
Figure 2B:
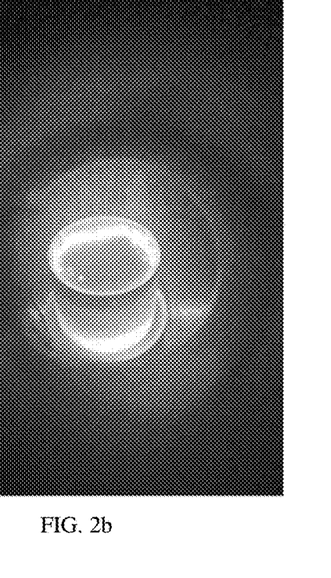
FIG. 2b shows an image of the sample crucible at high temperature.

The microwave laboratory setup which was used to produce one of the samples may be described as follows. A custom designed microwave applicator is used to heat samples to temperatures of up to 2000° C., with a maximum power input of 3 kW. The applicator arrangement is shown in FIG. 1. A microwave generator delivers power to the applicator via a WR340 waveguide auto-tuner, a PTFE window and a passive coupling element. The microwave generator is a 2.45 GHz YJ1600-based source (Sairem). A sample is placed within a crucible and positioned within the applicator, usually on a "pillar" or stand, at a predetermined height to obtain specific radiation distributions (see FIG. 2a). The unit is sealed and purged using nitrogen gas (99.9% pure) at a high flowrate for approximately 1 hour to establish an inert atmosphere and then a lower purge flowrate is used to maintain it. After this the power is gradually applied at a rate of 30 W/min to allow the sample to heat up slowly and rapidly achieve steady state at the desired final power. The steady power setting is chosen to achieve a desired temperature. The final power level is then held for a specific time, depending on the desired outcome. At this point the sample is glowing red and the crucible surface temperature can be measured using a handheld pyrometer through the sight glass, as shown in FIG. 2b. Pyrometer readings demonstrated a high level of fluctuation and uncertainty, thus a temperature band is reported. Power is then maintained steady for a given time frame, after which the generator is turned off and the resulting mixture sample allowed to cool for removal. Alternatively, a conventional, electrically heated furnace equipped with a pyrometer is used to generate the remaining samples.

To assess the conversion of biochar into graphite the analytical technique of X-ray diffraction (XRD) is used. A fitting procedure is applied to the obtained XRD pattern or spectrum based on the expected components of the mixture. A Rietveld programme is used to model the theoretical hexagonal and rhombohedral graphite cells. Amorphous carbon is modelled using a scaled lampblack reference pattern. In this manner the relative amounts of residual amorphous carbon and formed crystalline carbon can be inferred in order to calculate the conversion of one into the other.

Example 1

Figure 3:
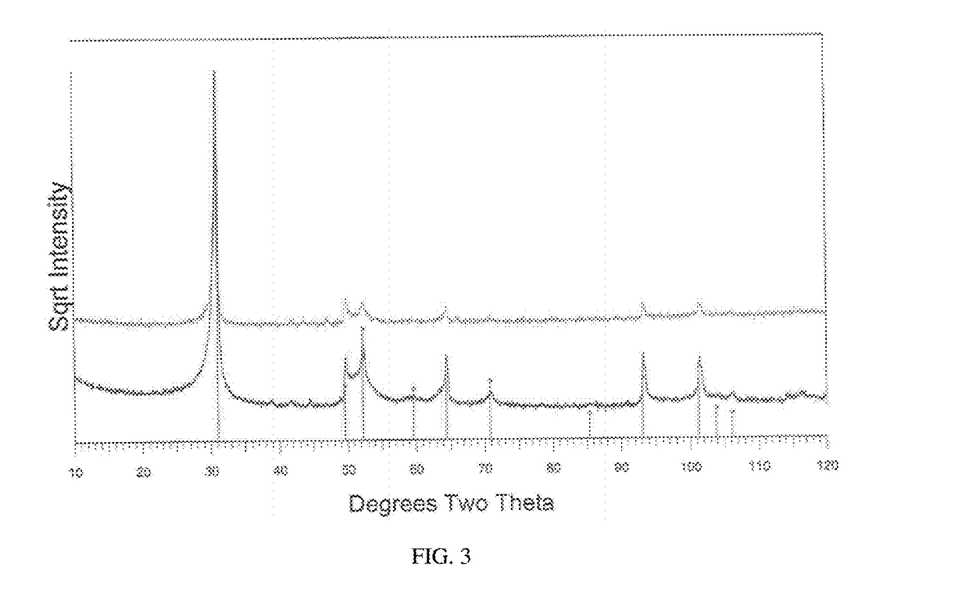
FIG. 3 shows an XRD diffractogram of the graphite sample generated during Example 1.

Sawdust (50 g) from pine trees (Pinus radiata) was hydrothermally treated with deionised water at a temperature of about 360 degrees Celsius for 20 min in an autoclave. The sample was allowed to cool and then filtered using a Buchner funnel; the resulting char was dried in a conventional oven. The dry char (10.1 g) with carbon content around 80%, was wet impregnated with a solution of 8.2 g of Manganese Acetate (tetrahydrate) in 16 ml water. The resulting mixture was placed in a crucible and dried in a conventional tray oven, after which it was transferred to the microwave applicator. Inert conditions were established, and power was gradually increased at a rate of approximately 30 W/min up to 1.3 kW. Temperature was measured to be between about 1400-1600 degrees Celsius. The power was maintained steady for around 5 to 10 minutes after which the power was cut. Once cooled the sample was sieved to below 1 mm, it was then leached with 500 ml of hydrochloric acid overnight, followed by washing with deionised water and filtering with a Buchner funnel. The resulting graphite was analysed using XRD (Bruker D8 Advance diffractometer using a mirror-derived 1 mm high parallel beam of cobalt K alpha radiation, weighted mean wavelength 1.709026 Angstroms) and BET surface area analysis. The XRD spectrum is shown in FIG. 3, with a d-spacing 0.3380 nm derived from the 002 peak location the degree of crystallinity is 93.0%. The spectrum was analysed using the stated procedure and a conversion of 90.9% of biochar into graphite was calculated. The sample was also found to have a surface area of 74.0 m²/g. For this sample the binary composition of the mixture post heat treatment can be stated as:
 (a) a carbon content of about 79 percent by weight,
 (b) a metal content of about 21 percent by weight
For this sample the composition of matter (dry wt/wt basis) can be stated as:
 (a) a biochar content of about 63.6 percent by weight,
 (b) a metallic compound content of about 36.4 percent by weight Example 2

Figure 4:
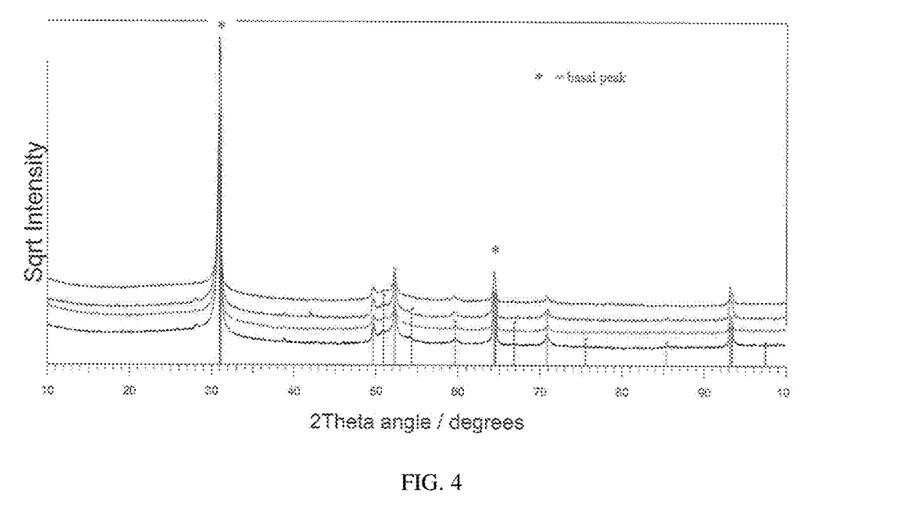
FIG. 4 shows an XRD diffractogram of the graphite sample generated during Example 2.

Pyrolyzed hard wood charcoal (~14 g) obtained from "Solid Energy" in New Zealand was milled and sieved to below 200 microns. The char, with a carbon content of around 70%, was combined with around 21 g of Iron Oxide using dry mixing. The resulting mixture was placed in a crucible and heated in a conventional, electrically heated furnace (RD WEBB Aircooled Vacuum Furnace model RD-G). Inert conditions were established by purging with Argon gas (>99.9%) and the temperature was increased at a ramp rate of 10 degrees per minute. Final temperature was set at 1750 degrees Celsius. The temperature was maintained steady for 180 minutes after which the furnace was switched off. Once cooled the sample was sieved to below 1 mm, it was then leached with 500 ml of hydrochloric acid overnight, followed by washing with deionised water and filtering with a Buchner funnel. The resulting graphite was analysed using XRD (Bruker D8 Advance diffractometer using a mirror-derived 1 mm high parallel beam of cobalt K alpha radiation, weighted mean wavelength 1.709026 Angstroms) and BET surface area analysis. The XRD spectrum is shown in FIG. 4, with a d-spacing 0.3368 nm derived from the 002 peak location the degree of crystallinity is 96.1%. The spectrum was analysed using the stated procedure and a conversion of 60.9% biochar into graphite was calculated. The sample was also found to have a surface area of 1.21 m²/g. For this sample the binary composition of the mixture post heat treatment can be stated as:
 (a) a carbon content of about 40 percent by weight,
 (b) a metal content of about 60 percent by weight
For this sample the composition of matter (dry wt/wt basis) can be stated as:
 (a) a biochar content of about 40 percent by weight,
 (b) a metal oxide content of about 60 percent by weight Example 3

Figure 5:
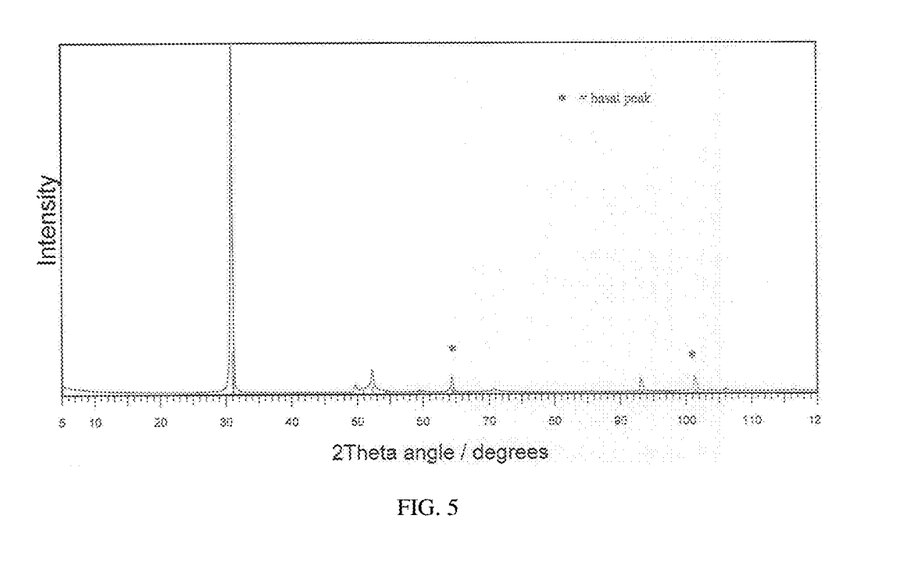
FIG. 5 shows an XRD diffractogram of the graphite sample generated during Example 3.
Figure 6:
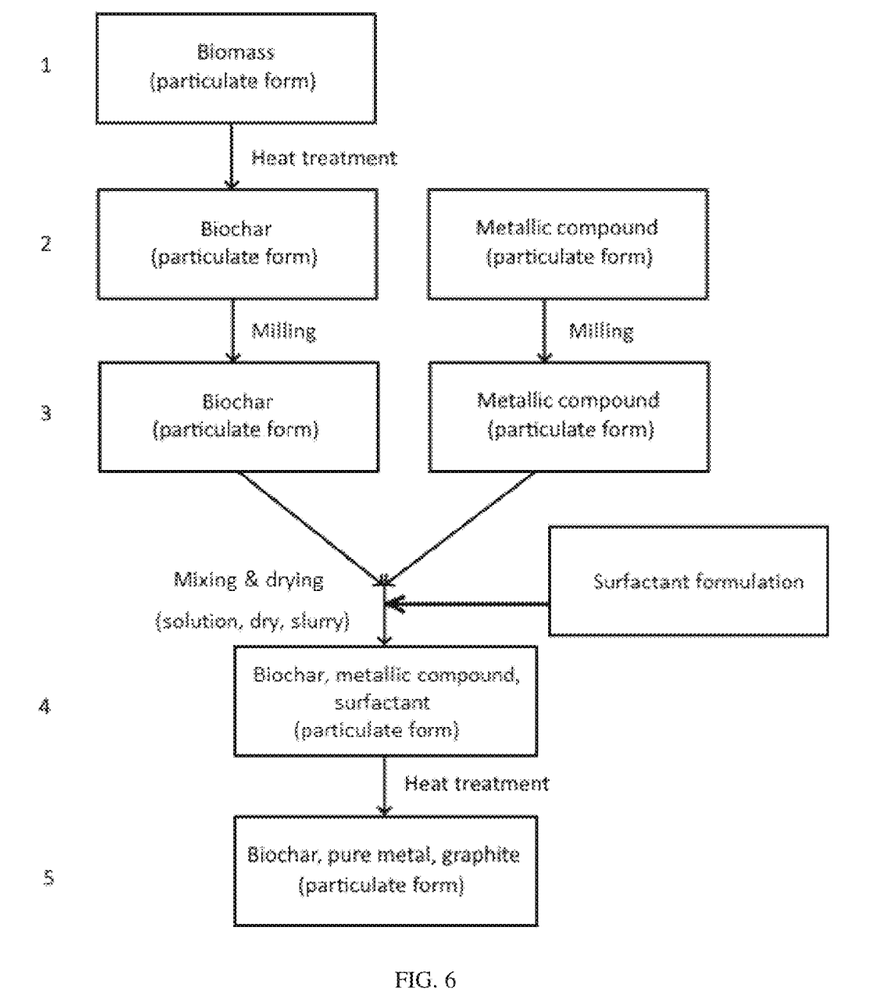
FIG. 6 is a process diagram showing the overall conversion of biomass to graphite anode powder for lithium-ion batteries.

Pyrolyzed hard wood charcoal (~9.8 g) obtained from "Solid Energy" in New Zealand was milled and sieved to below 500 microns. The char, with a carbon content of around 70%, was combined with around 15.1 g of iron oxide using wet mixing. First the char is combined with water (16 ml) and the surfactant: a mixture of 75 wt % water and 25 wt % ethanol (0.12 ml). Then the catalyst is combined with water (16 ml) and the surfactant: a mixture of 80 wt % water and 20 wt % sodium dodecyl benzene sulphonate (0.55 ml). Both suspensions are mechanically stirred and homogenized using a blade mixer and a sonication horn. The two suspensions are then mixed followed by are mechanical stirring and homogenization. Following this the product was placed in a conventional tray oven to dry. The resulting powder was placed in a crucible and heated in a conventional, electrically heated furnace (RD WEBB Aircooled Vacuum Furnace model RD-G). Inert conditions were established by purging with Argon gas (>99.9%) and the temperature was increased at a ramp rate of 10 degrees per minute. Final temperature was set at 1445 degrees Celsius. The temperature was maintained steady for 135 minutes after which the furnace was switched off. Once cooled the sample was sieved to below 1 mm, it was then leached with 500 ml of hydrochloric acid overnight, followed by washing with deionised water and filtering with a Buchner funnel. The resulting graphite was analysed using XRD (Bruker D8 Advance diffractometer using a mirror-derived 1 mm high parallel beam of cobalt K alpha radiation, weighted mean wavelength 1.709026 Angstroms) and BET surface area analysis. The XRD spectrum is shown in FIG. 5, with a d-spacing 0.3370 nm derived from the 002 peak location the degree of crystallinity is 95.7%. The spectrum was analysed using the stated procedure and a conversion of 98.2% biochar to graphite was calculated. The sample was also found to have a surface area of 1.98 m²/g. For this sample the binary composition of the mixture post heat treatment can be stated as:

(a) a carbon content of about 39 percent by weight,
(b) a metal content of about 61 percent by weight For this sample the composition of matter (dry wt/wt basis) can be stated as:

(a) a biochar content of about 38.5 percent by weight,
(b) a metal oxide content of about 59.3 percent by weight
(c) an additive formulation content of about 2.1 percent by weight The schematic outline of the overall process followed in Example 3 is shown in FIG. 6. The biomass (1) is converted to biochar (2) in particulate form. The biochar is then milled (3) and combined with an additive formulation to form a slurry. The metal oxide in particulate form is milled (3) and combined with an additive formulation to form a slurry. The two slurries are then combined to form the composition of matter (4), followed optionally by drying. The composition of the mixture (4) in terms of biochar, metal oxide, liquid and additives, are critical in the ability to form graphite with the desired properties at the desired conversion (5) during heat treatment.

REFERENCES

[1] Franklin, R. E., 1951. Crystallite growth in graphitizing and non-graphitizing carbons. Proceedings of the Royal Society of London. Series A. Mathematical and Physical Sciences, 209(1097), pp. 196-218.

What is claimed is:

1. A composition of matter comprising a mixture of a biochar, iron oxide, and an additive formation, wherein the mixture on a dry wt/wt basis comprises (a) iron oxide of between about 9.5 to about 80 percent by weight, (b) the additive formulation of between about 0.001 and about 5 percent by weight and (c) a biochar of between about 20 to about 90.5 percent by weight, wherein the biochar has a fixed carbon content of about 70%; and wherein the additive formulation is selected form one or more of the following: a surfactant, a binder, a dispersant, a rheology modifier, a wetting agent, an anti-foaming agent, and any combination thereof.

2. The composition as claimed in claim 1, wherein the mixture (dry wt/wt basis) comprises (a) iron oxide of between about 19 to about 67 percent by weight, (b) the additive formulation of between about 0.001 and about 5 percent by weight and (c) a biochar of between about 33 to about 81 percent by weight, wherein the biochar has a fixed carbon content of at least 70%.

3. The composition as claimed in claim 1, wherein the biochar in the mixture is in particulate form.

4. The composition as claimed in claim 3, wherein the initial particulate sizes of the biochar are less than about 50 millimeters.

5. The composition as claimed in claim 1, wherein the iron oxide in the mixture is in particulate form.

6. The composition as claimed in claim 1, wherein the iron oxide and biochar are both in particulate form.

7. The composition as claimed in claim 1, wherein the initial particulate sizes of the iron oxide are less than about 5 millimeters.

8. The composition as claimed in claim 6, wherein the initial particulate sizes of the biochar are less than about 50 millimeters and the initial particulate sizes of the iron oxide are less than about 5 millimeters.

9. The composition as claimed in claim 5, wherein the particulate sizes of the biochar are less than about 800 microns.

10. The composition as claimed in claim 1, wherein the composition further includes a liquid, the liquid being chosen to ensure that when the composition is in use there is minimal solubility of the iron oxide in the liquid.

11. The composition as claimed in claim 10 wherein the liquid is water.

12. The composition as claimed in claim 1, wherein the additive formulation comprises two or more of a surfactant, a binder, a dispersant, a rheology modifier, a wetting agent, an anti-foaming agent and any combination thereof.

13. The composition as claimed in claim 12, wherein the additive formulation comprises one or more additives selected from one or more of: acResin®, ACRODUR®, ACROFLOR®, ACRONAL®, AEROSOL C-61, AG 6202, ALCOSPERSE 175, ALMIPAL P, Amidex®, Aminoethyl Ethanolamine, Ammonium Fluoride, AMMONYX M, AQACell®, Aquatreat BW30, Arkopal, Armac®, Armeen®, Armid O, Attagel®, Aziridine, BASONAT® polyisocyanates, Bronidox, BTBAB-90, BTBAC-50, Bteac-50, BTMAC-50, BTMAH-40, BUTOFAN® styrene-butadiene binders, BUTONAL® styrene-butadiene binders, Butyl Stearate, Calcium Stearate, Darvan®, Dispex®, Dodecandioic acid, DYSPERSE®, EDAPLAN®, EFKA®, ENORDET, Ethoduomeen T/25, EURAMAAT, EUR-AMID, EURANAAT, EURASOL, EUROGLYC, EUROQUAT, EUROWET, EUROXIDE, EXOdis PC30, FOAMASTER MO 2133, FOAMSTAR®, Heliogen Blue D 7079, HYDROPALAT®, JONCRYL®, Lauryl Alcohol, Lipal MSC, Lipal NTD, Magna Surf®, MERPOL SE, METOLAT®, NANSA, Oleamid, Oleic acid, Pasatell M-182 (2-798), PEG-400, Pentaerythritol Oleate, POIZ 520, POIZ 530, Polyamides, Polyesters, POLYFON H, Polyglycols, Polyman®, Polymerizable Additives, Potassium Soyate, Quickpearl PK3, REAX®, REWOCID DU185 SE, Rewopol SB L 203, Rheovis®, ROKAmer 1010/50, Schercomid®, SDS, Sibet®, Sico 50BC, Sidos 70, Sodium dodecyl benzene sulphonate, Sodium N-hexadecanoyl-L-alaninate, Sodium silicate, Sorbitan Mono Oleate, Sorbitan Monopalmitate, Steamcare B12, Stearyl Chloride, STYROFAN®, SugaDet APG-10, Sulfoccinate LSS, Sulfochem®, Sulphated Butyl Oleate, Sunnol®, SURFACARE O ACID, TBAH-40, TBAHS-50, Tensol® DDM, TERGITOL®, TLMAC-30, TMAC-100 ARQUAD 41-100, Tomamine Amphoteric 12, Triethanolamine, Triethylbenzylammonium Chloride, TWEEN 80, UFACID K, Vitec®, YB-0100, YB-150, YB-191, YB-2000, YB-904, YBASD-200, and any combination thereof.

14. A method of heat treating the composition as defined in claim 1, to a temperature above the reduction temperature of the iron oxide, thereby reducing it to an elemental metal or an alloy.

15. The method as claimed in claim 14, wherein the heat treatment results in the conversion of amorphous biochar into crystalline graphite.

16. The method as claimed in claim 14, wherein the conversion of amorphous char to crystalline graphite formed by the heat treatment of the mixture is greater than about 50%.

17. The method as claimed in claim 14, wherein the degree of crystallinity of the crystalline graphite formed by the heat treatment of the mixture is greater than about 90%.

18. The method as claimed in claim 14, wherein the specific surface area of the graphite formed by the heat treatment of the composition of matter defined above is less than about 50 m$^2$/g.

19. A method of producing a composition as claimed in claim 1, the method including the steps of:
   i) thermally treating biomass in particulate form at a temperature of between about 200 and about 1000 degrees Celsius under inert conditions to form a particulate biochar using either dry pyrolysis or hydrothermal treatment;
   ii) milling the biochar to obtain a particle size of less than about 800 microns;
   iii) milling iron oxide to obtain a particle size of less than about 100 microns:
   iv) combining the resulting biochar with the iron oxide, a liquid and an additive formulation; and
   v) heating the mixture to between about 400 and about 3000 degrees Celsius under inert conditions to create graphitic carbon.

20. The method as claimed in claim 19, wherein the biomass is selected from:
   a. forestry residue,
   b. sawdust,
   c. lignocellulosic biomass or a lignin derivative, and
   d. woodchip or any other wood-based material.

21. The method as claimed in claim 19, wherein the liquid is water.

22. The method as claimed in claim 19, wherein the liquid and iron oxide are chosen to ensure that when in use there is minimal solubility of the metallic compound in the liquid.

23. The method as claimed in claim 19, wherein in step iv) the iron oxide is combined with either
   a. the biochar by wet blending together in a mixer with an additive formulation or
   b. the biochar by wet milling together in a mill with an additive formulation.

24. The method as claimed in claim 19, wherein the additive formulation for the mixed slurry includes two or more of: a surfactant, a binder, a dispersant, a rheology modifier, a wetting agent, an anti-foaming agent and any combination thereof.

25. The method as claimed in claim 19, wherein in step iv) a particulate slurry in water is formed by combining the iron oxide in water with an additive formulation using a mixer to produce a particulate iron oxide compound slurry.

26. The method as claimed in claim 19, wherein in step iv) a particulate slurry in water is formed by combining the biochar in water with additive formulation using a mixer to produce a particulate biochar slurry.

27. The method as claimed in claim 25, wherein the additive formulation is selected from: a binder, a dispersant, a rheology modifier, a wetting agent, an anti-foaming agent and any combination thereof.

28. The method as claimed in claim 26, wherein the particulate slurry is combined with the particulate biochar slurry and then blended together in a mixer.

\* \* \* \* \*